United States Patent [19]

Aron et al.

[11] Patent Number: 6,050,076
[45] Date of Patent: Apr. 18, 2000

[54] HAYMAKING MACHINE

[75] Inventors: Jérôme Aron, Dossenheim-sur-Zinsel; Marc Helfer, Ottersthal, both of France

[73] Assignee: Kuhn S.A., Saverne, France

[21] Appl. No.: 08/977,683

[22] Filed: Nov. 24, 1997

[30] Foreign Application Priority Data

Nov. 26, 1996 [FR] France ................................. 96 14819

[51] Int. Cl.⁷ .................................................. A01D 76/00
[52] U.S. Cl. .............................................. 56/366; 56/370
[58] Field of Search ............................ 56/366, 370, 377, 56/396, 380, 384

[56] References Cited

U.S. PATENT DOCUMENTS

| 3,650,101 | 3/1972 | Aron . | |
|---|---|---|---|
| 4,015,411 | 4/1977 | Van Der Lely et al. | 56/366 |
| 4,144,699 | 3/1979 | Aron . | |
| 4,149,364 | 4/1979 | Aron . | |
| 4,202,160 | 5/1980 | Van Der Lely | 56/366 |
| 4,628,673 | 12/1986 | Aron . | |
| 4,656,821 | 4/1987 | Aron . | |
| 4,693,065 | 9/1987 | Aron et al. . | |
| 4,723,404 | 2/1988 | Aron . | |
| 4,875,332 | 10/1989 | Aron . | |
| 4,914,901 | 4/1990 | Aron . | |
| 4,922,700 | 5/1990 | Aron . | |
| 4,953,346 | 9/1990 | Aron . | |
| 5,024,053 | 6/1991 | Aron . | |
| 5,060,465 | 10/1991 | Aron . | |
| 5,111,636 | 5/1992 | Quirin . | |
| 5,274,990 | 1/1994 | Aron et al. . | |
| 5,548,949 | 8/1996 | Gantzer . | |
| 5,586,421 | 12/1996 | Aron . | |

FOREIGN PATENT DOCUMENTS

| 951910 | 7/1974 | Canada | 56/370 |
|---|---|---|---|
| 1327063 | 4/1963 | France | 56/366 |
| 1800497 | 5/1969 | Germany | 56/370 |
| 19 32 229 | 3/1970 | Germany . | |
| 2 127 701 | 10/1972 | Germany . | |
| 2418154 | 10/1974 | Germany | 56/370 |
| 1782865 | 1/1975 | Germany | 56/370 |
| 2448456 | 4/1975 | Germany | 56/370 |
| 2448500 | 4/1975 | Germany | 56/370 |
| 40 21 812 A1 | 1/1991 | Germany . | |
| 94 00 521 4 | 5/1994 | Germany . | |
| 6511984 | 3/1967 | Netherlands | 56/366 |
| 6513220 | 4/1967 | Netherlands | 56/366 |
| 6708612 | 12/1967 | Netherlands | 56/366 |
| 7 607 093 | 1/1978 | Netherlands . | |
| 2027574 | 2/1980 | United Kingdom | 56/370 |

*Primary Examiner*—Thomas B. Will
*Assistant Examiner*—Arpad Fabian Kovacs
*Attorney, Agent, or Firm*—Oblon, Spivak, McClelland, Maier & Neustadt, P.C.

[57] ABSTRACT

A haymaking machine, especially a windrower of mown plant matter, comprising a frame several windrowing rotors which are driven in rotation during work about substantially vertical axes having supports fitted with carrier wheels, the frame comprising a draft beam and a connecting beam to which at least one of the windrowing rotors is connected, the connecting beam being articulated with respect to the draft beam so that it can be moved, together with the rotor or rotors connected to it, laterally to the right and/or to the left, at least the rotor furthest from the articulation to the draft beam being flanked by a windrowing deflector which can be adjusted into several positions with respect to the rotor, the windrowing deflector is connected by means of at least one lever to a support, the support is connected to the substantially vertical axis of the rotor beside which the windrowing deflector is situated, the lever is connected to the connecting beam by means of a rod and can be moved with respect to the support through the rod.

11 Claims, 6 Drawing Sheets

HAYMAKING MACHINE

BACKGROUND OF THE INVENTION

1. Field of the Invention

The present invention relates to a haymaking machine, especially a windrower of mown plant matter, comprising a frame with several windrowing rotors, which windrowing rotors are driven in rotation during work about substantially vertical axes which are provided with supports fitted with carrier wheels, said frame comprising a draft beam and a connecting beam to which at least one of the windrowing rotors is connected, the connecting beam being articulated with respect to the draft beam so that it can be moved, together with the rotor or rotors connected thereto, laterally to the right and/or to the left, at least the rotor furthest from the articulation to the draft beam being flanked by a windrowing deflector which can be adjusted into several positions with respect to said rotor.

2. Discussion of the Background

In a known machine of this kind, the lateral movements of the connecting beam and of the rotor or rotors connected thereto are achieved by means of hydraulic rams operated from the tractor. These lateral movements are intended to offset the rotors in order to bring them into an oblique line relative to the direction of forward travel for windrowing work and to align them one behind the other for transport.

During these movements, the user nonetheless is obliged manually to alter the position of the windrowing deflector. He has to move it away from the rotor in the work position and bring it as close as possible to said rotor for transport, in order to reduce the width of the machine. These operations are tiresome for the user, and lead to time being lost. The user needs each time to stop the tractor, get down from his seat, walk as far as the rear end of the machine, move the deflector, and return to the tractor. There is also a risk that the user may omit to alter the position of the windrowing deflector. This is particularly serious when the machine needs to be moved on a road, because the deflector then extends beyond the overall size of the machine.

SUMMARY OF THE INVENTION

The object of the present invention is to eliminate the aforementioned drawbacks of the known machine. In particular, it needs to simplify the operations of adjusting the windrowing deflector and ensure that they are carried out correctly during each change of position.

Thus an important feature of the invention consists in the fact that the windrowing deflector is connected by means of at least one lever to a support which is connected to the substantially vertical axis of the rotor beside which said windrowing deflector is situated, that this lever can be moved with respect to said support, and that it is connected to the connecting beam of the frame via a rod.

This arrangement makes it possible to obtain automatic adjustment of the position of the windrowing deflector when the connecting beam is moved to bring the machine into the work position or into the transport position. Said beam then operates the rod which moves the lever in such a way that it brings the windrowing deflector closer to the rotor during a move into the transport position, and that it moves it away therefrom during a move into the work position.

The means employed for automatically adjusting the windrowing deflector are extremely simple and do not require any special maneuvers on the part of the user.

According to another feature, the rod is articulated with respect to the lever and to the connecting beam by means of axes, at least one of which is movable. This makes it possible for the distance between the windrowing deflector and the rotor with which it is associated to be varied in the work position. The user can thus select said distance to suit the amount of forage to be windrowed. What is more, irrespective of the position of this windrowing deflector during work, it comes back automatically against said rotor during the move into the transport position.

BRIEF DESCRIPTION OF THE DRAWINGS

Other features and advantages of the invention will emerge from the description which will follow and which refers to the appended drawings which depict, by way of nonlimiting examples, a number of embodiments of the machine according to the invention.

In these drawings.

DESCRIPTION OF THE PREFERRED EMBODIMENT

Figure 1:
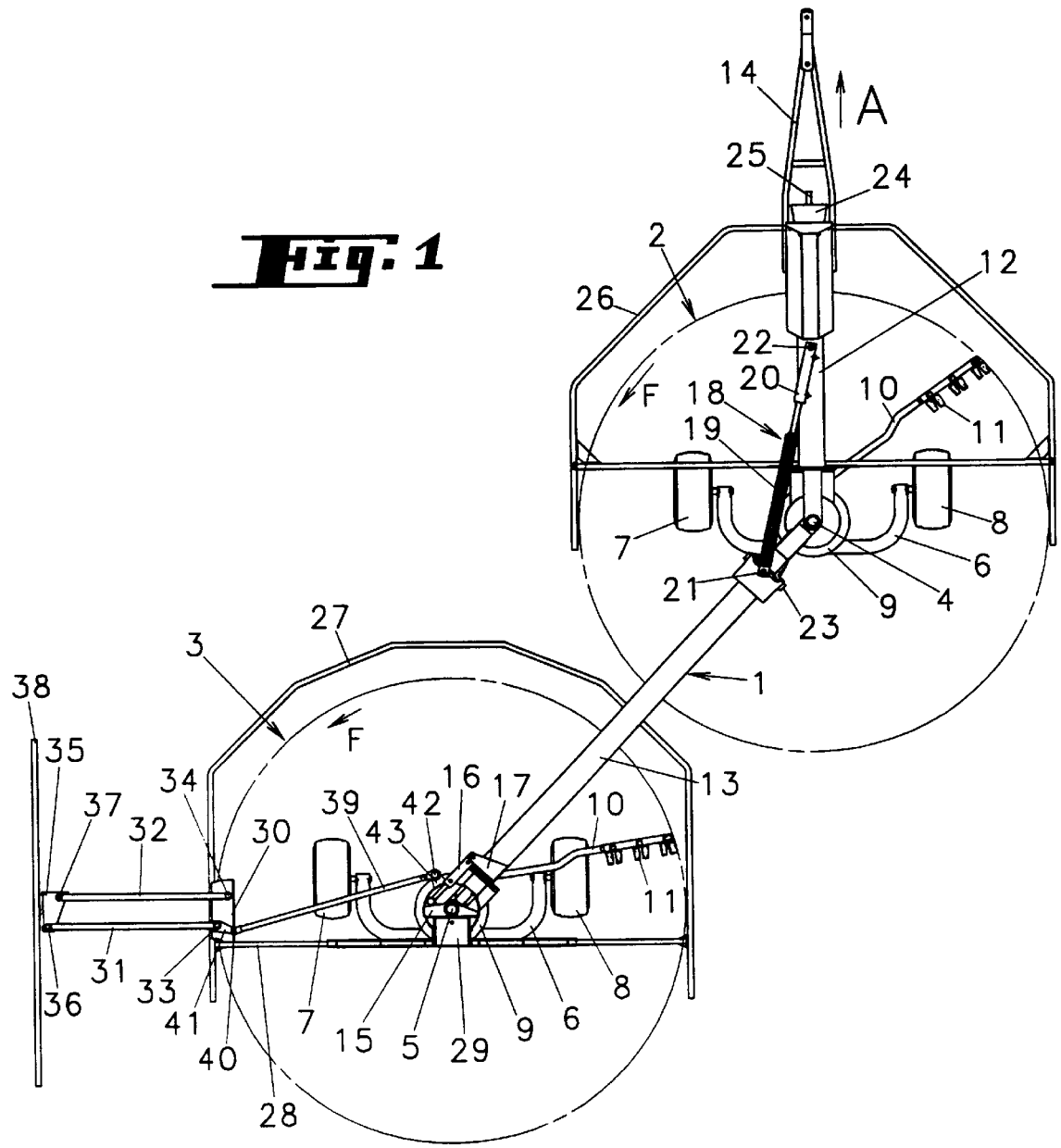
FIG. 1 depicts a top view of a machine according to the invention in the work position.
Figure 2:
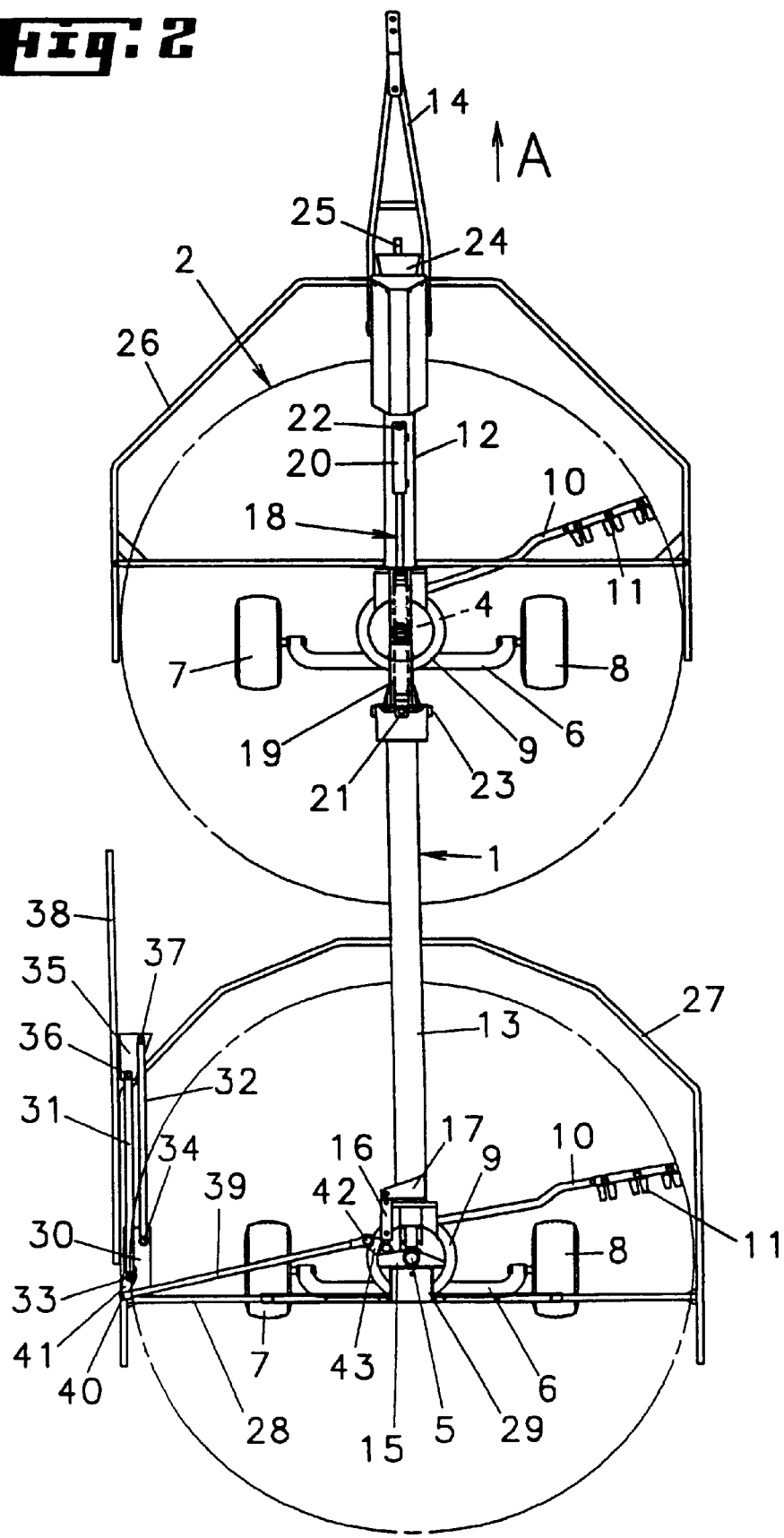
FIG. 2 depicts the same machine in the transport position.

As depicted in FIGS. 1 and 2, the machine according to the invention comprises a frame 1 which carries two windrowing rotors 2 and 3 situated a certain distance apart. These rotors 2 and 3 are mounted so that they rotate on substantially vertical axes 4 and 5. Each of these axes 4 and 5 at its lower end carries a support 6 fitted with two carrier wheels 7 and 8. This support 6 can be adjusted hydraulically heightwise with respect to the corresponding axis 4, 5 so that the distance of the corresponding rotor 2 or 3 from the ground can be modified.

Each of these rotors 2 and 3 is essentially composed of a central casing 9 which is mounted on the corresponding axis 4, 5 by means of ball bearings. This central casing 9 carries several arms 10 which extend in a practically horizontal plane. Just one of these arms 10 is depicted, to keep the drawings clear. At their ends furthest from said casing 9 these arms are fitted with raking forks 11. Each of these arms 10 is mounted in a bearing of the central casing 9 so that it can pivot on itself, that is to say about its longitudinal geometric axis. In the central casing 9 there is an operating cam which is fixed to the corresponding axis 4, 5. Each fork-bearing arm 10 at its end inside the central casing 9 has a roller which interacts with said operating cam.

The frame 1 comprises a draft beam 12 and a connecting beam 13. The draft beam 12 is fixed to the upper end of the substantially vertical axis 4 of the rotor 2 known as the first rotor. This beam extends above this rotor 2, slightly beyond its fork-bearing arms 10.

At its end furthest from the axis 4 of the rotor 2 it has a drawbar 14 which allows hitching to a tractor used to move and drive the machine. One of the ends of the connecting beam 13 is articulated to the substantially vertical axis 4 of the first rotor 2 in such a way that it can pivot about it. It could just as easily be articulated to a substantially vertical axis which is rigidly fastened to the draft beam 12. The other end of the connecting beam 13 is articulated to the substantially vertical axis 5 of the second rotor 3. This axis 5 can revolve on itself with respect to the beam 13. At its upper end it has a sleeve 15. This sleeve is immobilized on said end using a means such as a key or a pin. This sleeve 15 has a lateral arm to which the rod of a hydraulic ram 16 is articulated. The body of this hydraulic ram 16 is articulated to a clevis 17 which is rigidly fastened to the connecting beam 13. Said hydraulic ram 16 can be operated from the tractor. It allows the sleeve 15 to be moved in such a way that it makes the substantially vertical axis 5 rotate on itself.

A retaining device 18 is arranged between the draft beam 12 and the connecting beam 13 to encourage the second rotor 3 to be placed in a position that is laterally offset with respect to the first rotor 2 during work. This retaining device 18 is made up of a spring 19 and a hydraulic ram 20. Said spring 19 is fastened, by one of its ends, to an axis 21 which is rigidly fastened to the connecting beam 13 and, by its other end, to the rod of the hydraulic ram 20. The body of the latter is articulated by means of an axis 22 to the draft beam 12.

The connecting beam 13 comprises an axis of articulation 23 made of two parts aligned with one another. This axis 23 is substantially horizontal and extends transversely to the beam 13. It is situated close to the substantially vertical axis 4 of the first rotor 2, and this allows the second rotor 3 to move heightwise by a significant amount about said axis 23, to follow the unevenness of the ground.

Rotational drive to the two rotors 2 and 3 is supplied mechanically from the tractor power take-off. For this, the draft beam 12 at its front end has an input casing 24 with a shaft 25 to which a cardan shaft driven from the tractor can be connected. Housed in the draft beam 12 is a first transmission shaft which extends from the input casing 24 as far as the first rotor 2. It carries a pinion which meshes with a gear ring which is rigidly fastened to the central casing 9 of this rotor 2. A second transmission shaft which is housed in the connecting beam 13 extends between the two rotors 2 and 3. At its front end it has a pinion which meshes with a second gear ring which is also rigidly fastened to the central casing 9 of the first rotor 2, and the teeth of which are on the opposite side from those of the aforementioned gear ring. At its rear end it has another pinion which meshes with a gear ring which is rigidly fastened to the central casing 9 of the second rotor 3. This second transmission shaft has a cardan joint at the axis of articulation 23 of the connecting beam 13.

The draft beam 12 has a guard 26. This consists of a bent tube which surrounds at least the front half of the first rotor 2. A second guard 27 surrounds the front half of the second rotor 3. It consists of a bent tube fixed to a transverse support 28. This support 28 is connected to the sleeve 15 by a brace 29.

The support 28 additionally comprises a plate 30 to which two levers 31 and 32 are articulated by means of substantially vertical axes 33 and 34. These levers 31 and 32 are substantially parallel and substantially the same length. They are also articulated to a lug 35 by means of substantially vertical axes 36 and 37. This lug 35 is rigidly fastened to a windrowing deflector 38 which extends laterally to the second rotor 3. This deflector 38 is made in the form of a cloth or screen and points in the direction of forward travel A.

The lever 31 is connected to the connecting beam 13 of the frame 1 by means of a rod 39. The latter is articulated, using a first substantially vertical axis 40 to a lug 41 of the lever 31 and, using a second substantially vertical axis 42, to a lug 43 which is rigidly fastened to the connecting beam 13. This lug 43 is situated slightly further forward than the axis 5 of the second rotor 3. The lug 41 of the lever 31 is situated beyond the axis of articulation 33 articulating it to the support 28, 30. On account of this arrangement, the connecting beam 13 moves the rod 39 when it is itself pivoted about the substantially vertical axis 4 of the first rotor 2. Said rod 39 therefore actuates the lever 31 in such a way that it moves the deflector 38 closer to or further away from the second windrowing rotor 3.

At least one of the axes of articulation 40 and 42 of the rod 39 may be moved so that the position of the windrowing deflector 38 can be adjusted during work. In the example depicted in FIGS. 3 and 4, the lug 41 of the lever 31 has a number of holes 44 in each of which the axis of articulation 40 of the rod 39 can be engaged. It is thus possible, by selecting one or the other of these holes 44, to alter the distance during work between the windrowing deflector 38 and the rotor 3. An intermediate position is depicted in chain line in FIG. 3. The holes 44 are on an arc of a circle 45 the center of which is on the axis of articulation 42 of the rod 39 when the machine is in the transport position (FIG. 4). On account of this arrangement, the rod 39 and the lever 31 automatically bring the deflector 38 from each one of its work positions, back against the rotor 3 when moving into the transport position.

Figure 5:
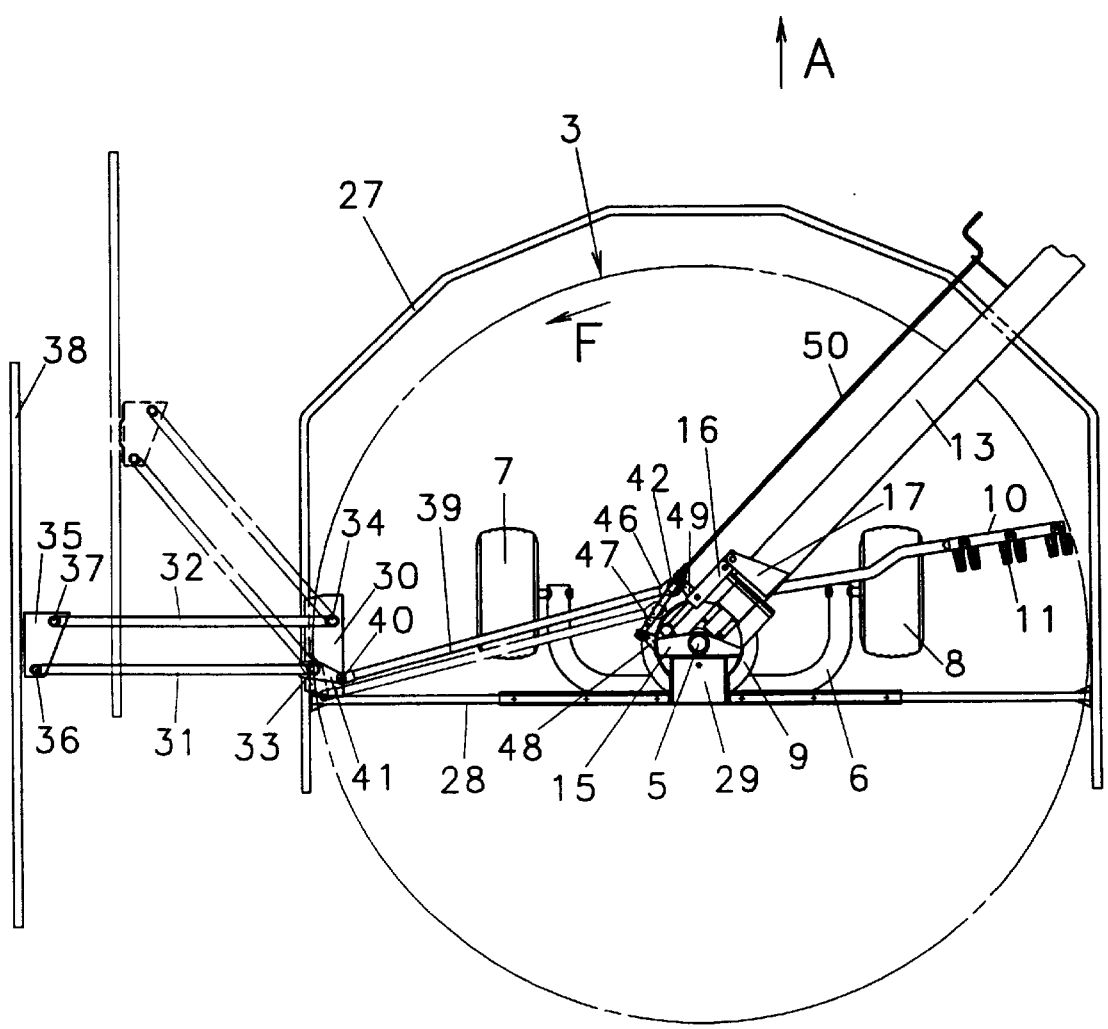
FIG. 5 depicts a detail view of another embodiment of the means for adjusting the windrowing deflector in various work positions.
Figure 6:
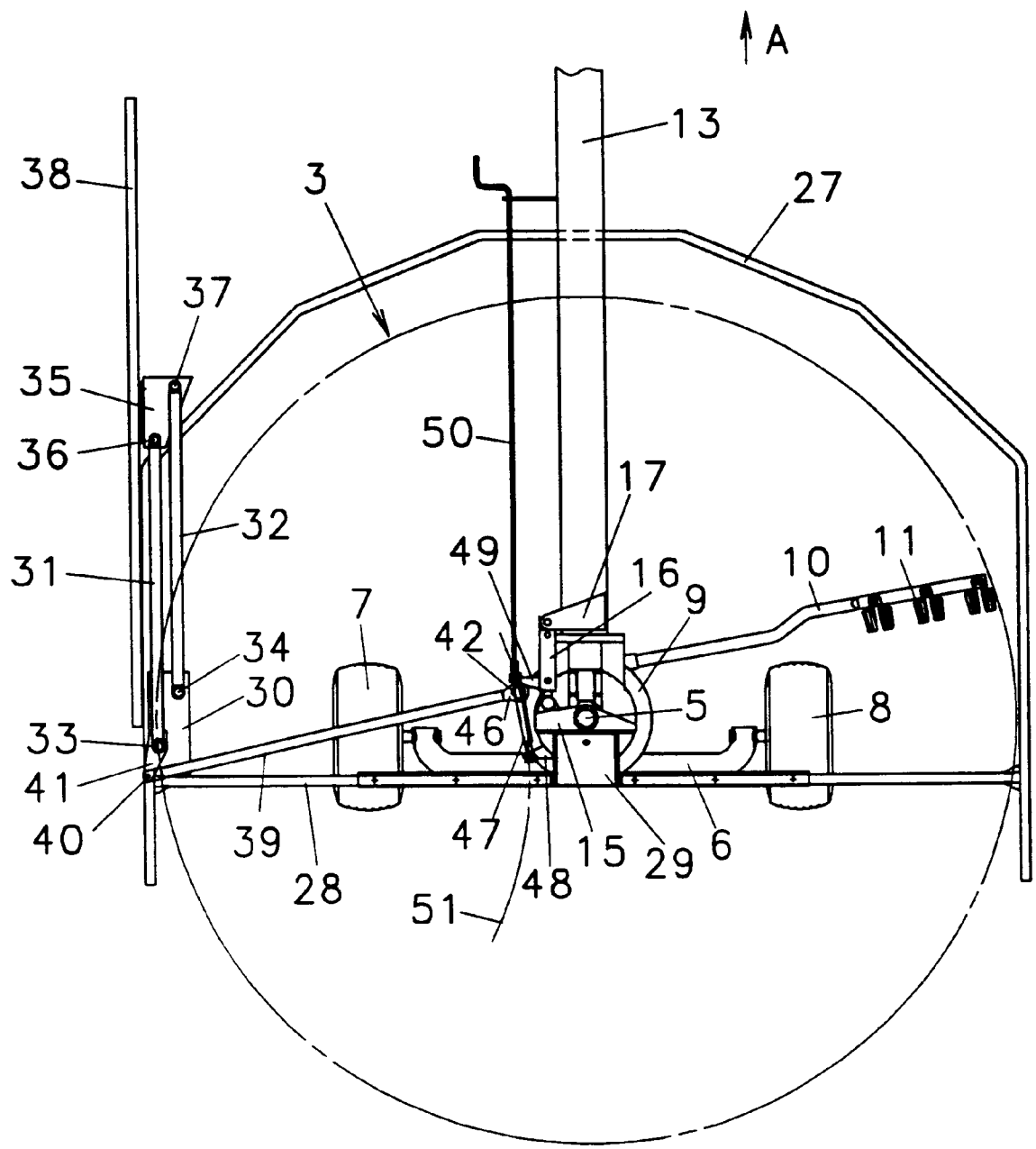
FIG. 6 depicts the adjustment means according to the example of FIG. 5 in the transport position.

In the example according to FIGS. 5 and 6, the rod 39 is articulated by means of the axis 40 to a lug 41 which is rigidly fastened to the lever 31, and by means of the axis 42 to a slide 46 which is connected to the connecting beam 13. This slide 46 is screwed onto a threaded rod 47 which is held by lugs 48 and 49 which are rigidly fastened to the connecting beam 13. This threaded rod 47 is free to rotate but cannot move in translation. It is connected to a cranking handle 50 which allows it to be rotated on itself. The slide 46 therefore moves longitudinally along this threaded rod 47. Thus it moves the axis of articulation 42 of the rod 39. The latter thus actuates the lever 31 in such a way that it pivots about its axis of articulation 33 and alters the position of the windrowing deflector 38 with respect to the rotor 3. This embodiment offers a wider choice of positions for the windrowing deflector 38.

The threaded rod 47 is advantageously tangential to an arc of a circle 51 the center of which is on the axis of articulation 40 articulating the rod 39 to the lug 41 of the lever 31 when the machine is in the transport position (FIG. 6). Thus the rod 39 and the lever 31 automatically bring the windrowing deflector 38 back against the rotor 3 when moving into the transport position, and this is true irrespective of the position occupied by this deflector during work.

The windrower described hereinabove can be hitched to a tractor by means of the drawbar 14 and moved in the direction A. When the user reaches the windrowing site, the machine is in the transport position, in which the rotors 2 and 3 are one behind the other (FIG. 2). To bring the machine into the work position (FIG. 1), he actuates from the tractor the hydraulic ram 16 situated between the connecting beam 13 and the sleeve 15 to make this ram lengthen. This then, via said sleeve 15 makes the substantially vertical axis 5 of the second rotor 3 rotate on itself. The support 6 and the carrier wheels 7 and 8 rotate with said axis 5 and orientate themselves toward the left-hand side, when looking in the direction of forward travel A. The brace 29, the transverse support 28 and the guard 27 also turn with said axis 5. The rod 39 then pulls on the lug 41 of the lever 31 in such a way that this lever pivots about its axis of articulation 33 and automatically moves the windrowing deflector 38 away from the rotor 3. The second lever 32 pivots in a similar way about its axis of articulation 34 in such a way that the deflector 38 always points in the direction of forward travel A.

Figure 3:
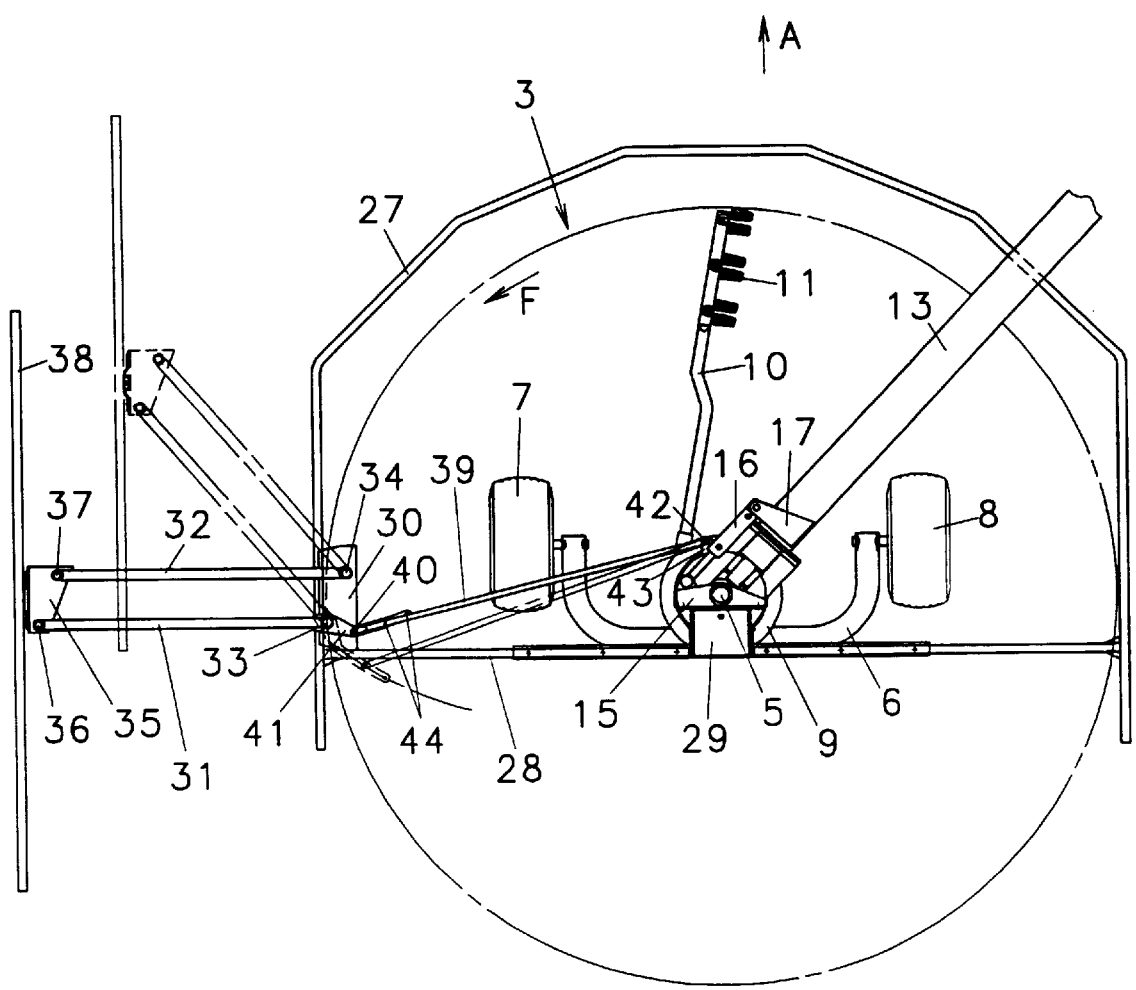
FIG. 3 depicts a detail view of one embodiment of the means for adjusting the windrowing deflector in various work positions.
Figure 4:
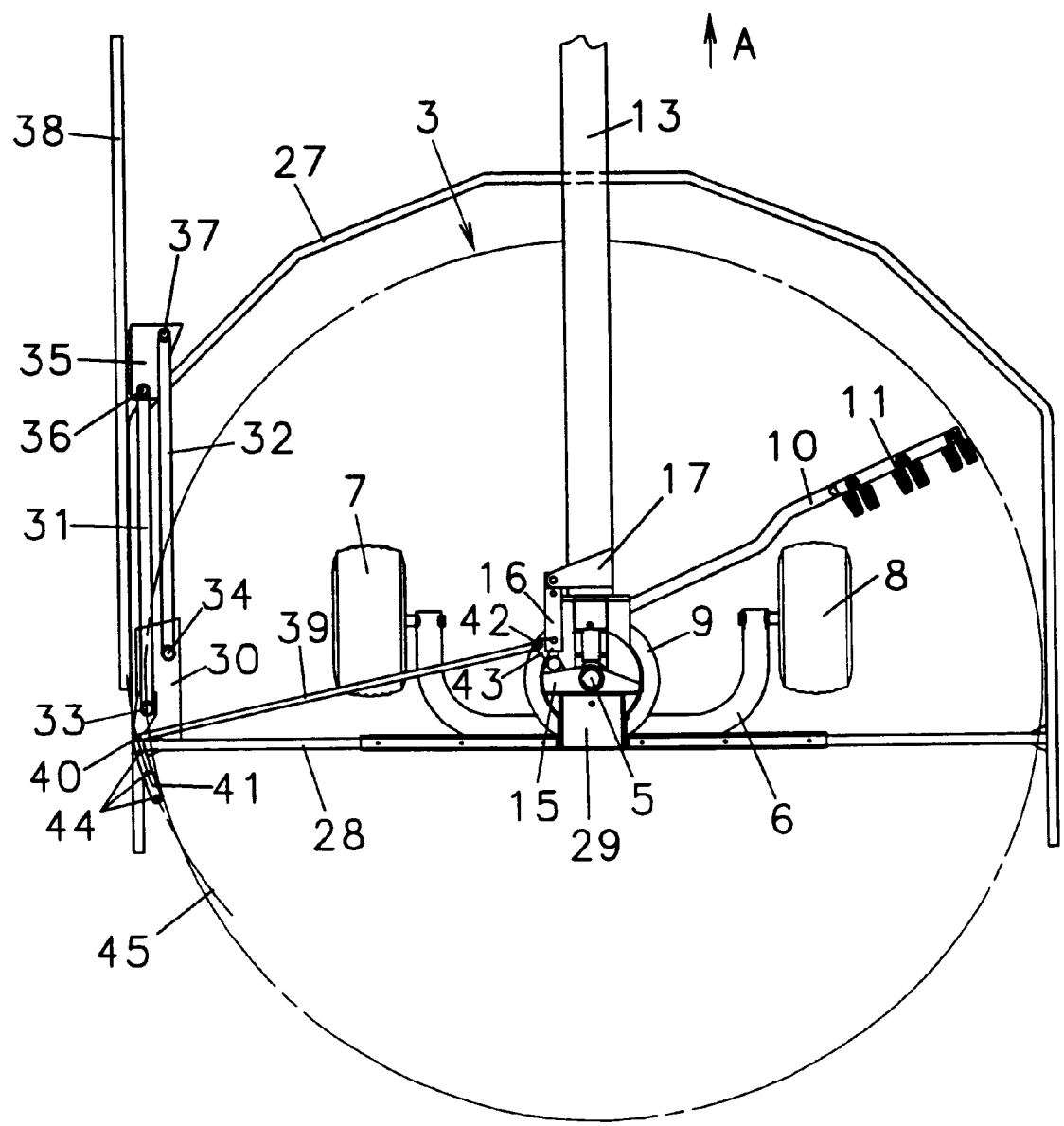
FIG. 4 depicts the adjustment means according to the example of FIG. 3 in the transport position.

In the example according to FIGS. 3 and 4, the desired movement of the deflector 38 can be adjusted to suit the volume of forage to be windrowed. Thus, when there is a substantial volume, the axis of articulation 40 of the rod 39 is placed in the hole 44 of the lug 41 closest to the axis of articulation 33 of the lever 31. The latter will then pivot outward to the maximum extent, to be on a wide distance from the rotor 3. By contrast, if the volume of forage to be windrowed is small, the user will choose a hole 44 further from the axis of articulation 33 of the lever 31. In this case, the outward pivoting will not be as great, and this will encourage the formation of a compact windrow.

In the example according to FIGS. 5 and 6, the distance between the windrowing deflector 38 and the rotor 3 is increased when the user moves the slide 46 along the threaded rod 47 in the direction of forward travel A. The rod 39 then makes the lever 31 pivot outward through an angle which may be as much as 90°. Lesser distances are obtained when the slide 46 is further back on the threaded rod 47. The aforementioned movements of the slide 46 are achieved by turning the threaded rod 47 using the cranking handle 50.

The axis 40 or 42 of the rod 39 can be positioned before the change to the work position, or at any moment during work.

Having rotated the substantially vertical axis 5 as described earlier, the user moves the machine along in the direction A. He may also carry out the two operations simultaneously. The carrier wheels 7 and 8 then make the connecting beam 13 turn about the substantially vertical axis 4 of the first rotor 2 until they orient themselves again in the direction of forward travel A. In this new position, the second rotor 3 is offset with respect to the first rotor 2. In this position, the user operates the hydraulic ram 20 of the retaining device 18 in such a way that the ram shortens. It then tensions the spring 19 which pulls on the connecting beam 13. This beam thus remains in the oblique position under all conditions.

All the user then needs to do is lower the rotors 2 and 3 by pivoting the supports 6 downward in such a way that the forks 11 touch the ground and drive them in rotation using the tractor power take-off. They then rotate in the same direction F. The forks 11 at the front part of their path, pick up the forage lying on the ground. They then deposit it in the form of a windrow in the lateral part of their path. Because of the layout of the two rotors 2 and 3, the forage deposited by the first rotor 2 is taken back up by the second rotor 3 which forms a more voluminous lateral windrow against the windrowing deflector 38.

To move the machine into the transport position depicted in FIG. 2, the user actuates the hydraulic means of the supports 6 so as to raise the rotors 2 and 3 and lift the forks 11 clear of the ground. Next, he operates the hydraulic ram 16 to make it shorten and turn the sleeve 15, the substantially vertical axis 5 and the support 6 with the carrier wheels 7 and 8. The latter then pivot to the right and orientate themselves in a direction parallel to the connecting beam 13. The support 28 of the guard 27 also turns to the right with the sleeve 15. The rod 39 then pushes on the lug 41 and makes the lever 31 pivot about its axis of articulation 33 in such a way that it automatically brings the windrowing deflector 38 back against the rotor 3. The second lever 32 pivots in the same way about its axis of articulation 34. These two levers 31 and 32 thus position the deflector 38 in a position which is parallel to the connecting beam 13.

In each of the embodiments according to FIGS. 3, 4 and 5, 6, the deflector 38 is brought automatically back against the rotor 3 so as to obtain a maximum reduction in the width of the machine for transport.

All that remains is for the ram 20 of the retaining device 18 to be operated to make it lengthen and release the spring 19 and to move the machine in the direction A. The second rotor 3 and the connecting beam 13 pivot automatically about the substantially vertical axis 4 of the first rotor 2 and position themselves behind it. The width of the machine is thus considerably reduced.

The operating of the hydraulic rams 16 and 20 may be synchronized to make the user's job easier.

It is quite obvious that the invention is not restricted to the embodiments described and depicted in the appended drawings. Modifications are possible, especially as regards the construction of the various elements, or by substituting technical equivalents, without in any way departing from the field of protection.

What is claimed as new and desired to be secured by Letters Patent of the United States is:

1. A haymaking machine, especially a windrower of mown plant matter, comprising:

a frame;

several windrowing rotors which are driven in rotation during work about substantially vertical axes having supports fitted with carrier wheels;

said frame comprising a draft beam and a connecting beam to which at least one of the windrowing rotors is connected;

said connecting beam being articulated with respect to the draft beam so that it can be moved, together with the rotor or rotors connected to it, laterally to the right and/or to the left;

at least the rotor furthest from the articulation to the draft beam being flanked by a windrowing deflector which can be adjusted into several positions with respect to said rotor;

wherein:

the windrowing deflector is connected by means of at least two levers to a support, wherein said at least two levers are substantially parallel and have substantially the same length, and which are articulated with respect to the support and to the windrowing deflector by means of substantially vertical axises;

said support is connected to the substantially vertical axis of the rotor beside which the windrowing deflector is situated;

at least one of said at least two levers is connected to the connecting beam by means of a rod and can be moved automatically with respect to the support through said rod when said connecting beam is moved to bring the machine into the work position or into the transport position.

2. A machine as claimed in claim 1, wherein the rod is articulated around a substantially vertical axis to a lug of the lever and a lug which is rigidly fastened to the connecting beam.

3. A machine as claimed in claim 2, wherein the lug is situated beyond the axis of articulation articulating the lever to the support.

4. A machine as claimed in claim 2, wherein at least one of the axes of articulation of the rod is movable.

5. A machine as claimed in claim 4, wherein the lug has several holes for the axis of articulation of the rod.

6. A machine as claimed in claim 5, wherein the holes in the lug are arranged in an arc of a circle the center of which is on the other axis of articulation of the rod when the machine is in the transport position.

7. A machine as claimed in claim 1, wherein the rod is articulated to a lug which is rigidly fastened to the lever and to a slide connected to the connecting beam.

8. A machine as claimed in claim 2, wherein the slide is movable along a threaded rod which is held by lugs which are rigidly fastened to the connecting beam.

9. A machine as claimed in claim 8, wherein the threaded rod is free to rotate but cannot move in translation.

10. A machine as claimed in claim 9, wherein the threaded rod is connected to a cranking handle.

11. A machine as claimed in claim 8, wherein the threaded rod is tangential to an arc of a circle the center of which is on the other axis of articulation of the rod when the machine is in the transport position.

* * * * *

UNITED STATES PATENT AND TRADEMARK OFFICE
CERTIFICATE OF CORRECTION

PATENT NO. : 6,050,076
DATED : April 18, 2000
INVENTOR(S) : Jerome Aron, et al.

Page 1 of 1

It is certified that error appears in the above-identified patent and that said Letters Patent is hereby corrected as shown below:

<u>Column 8,</u>
Line 1, change "2" to -- 7 --.

Signed and Sealed this

Twenty-first Day of August, 2001

*Attest:*

Nicholas P. Godici

*Attesting Officer*

NICHOLAS P. GODICI
*Acting Director of the United States Patent and Trademark Office*